US008621150B2

(12) United States Patent
Serrano et al.

(10) Patent No.: US 8,621,150 B2
(45) Date of Patent: Dec. 31, 2013

(54) DATA PLACEMENT OPTIMIZATION USING DATA CONTEXT COLLECTED DURING GARBAGE COLLECTION

(75) Inventors: Mauricio J. Serrano, Bronx, NY (US); Xiaotong Zhuang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 12/757,173

(22) Filed: Apr. 9, 2010

(65) Prior Publication Data

US 2011/0252199 A1 Oct. 13, 2011

(51) Int. Cl.
*G06F 12/00* (2006.01)
*G06F 13/00* (2006.01)
*G06F 13/28* (2006.01)

(52) U.S. Cl.
USPC ............. 711/118; 711/166; 711/E12.009; 711/E12.017

(58) Field of Classification Search
USPC ............. 711/118, 166, E12.009, E12.017
See application file for complete search history.

(56) References Cited

U.S. PATENT DOCUMENTS

| 6,061,398 | A | * | 5/2000 | Satoh et al. | 375/240 |
| 2003/0061015 | A1 | * | 3/2003 | Ben-Gal et al. | 703/2 |
| 2004/0215880 | A1 | * | 10/2004 | Chilimbi et al. | 711/118 |
| 2005/0204349 | A1 | * | 9/2005 | Lewis et al. | 717/162 |
| 2005/0268277 | A1 | * | 12/2005 | Reeder et al. | 717/104 |
| 2007/0156967 | A1 | * | 7/2007 | Bond et al. | 711/137 |
| 2008/0168249 | A1 | * | 7/2008 | Hirzel et al. | 711/170 |
| 2008/0243300 | A1 | * | 10/2008 | Liu et al. | 700/213 |

OTHER PUBLICATIONS

Imai, Akira et al., "Evaluation of Parallel Copying Garbage Collection on a Shared-Memory Multiprocessor", IEEE Transactions on Parallel and Distributed Systems, 4(9), 1993, pp. 1030-1040.
Inagaki, Tatsushi et al., "Stride Prefetching by Dynamically Inspecting Objects", Programming Language Design and Implementation (PLDI), 2003, pp. 269-277.
Inoue, Hajime et al., "Object Lifetime Prediction in Java", IEEE Transactions on Computers, 55(7), 2006, 18 pages.
Kawachiya, Kiyokuni et al., "Analysis and Reduction of Memory Inefficiencies in Java Strings", OOPSLA, 2008, pp. 385-401.
Lattner, Chris et al., "Automatic Pool Allocation: Improving Performance by Controlling Data Structure Layout in the Heap", Programming Language Design and Implementation (PLDI), 2005, 14 pages.

(Continued)

*Primary Examiner* — Sheng-Jen Tsai
(74) *Attorney, Agent, or Firm* — Stephen J. Walder, Jr.; Jennifer R. Davis

(57) ABSTRACT

Mechanisms are provided for data placement optimization during runtime of a computer program. The mechanisms detect cache misses in a cache of the data processing system and collect cache miss information for objects of the computer program. Data context information is generated for an object in an object access sequence of the computer program. The data context information identifies one or more additional objects accessed as part of the object access sequence in association with the object. The cache miss information is correlated with the data context information of the object. Data placement optimization is performed on the object, in the object access sequence, with which the cache miss information is associated. The data placement optimization places connected objects in the object access sequence in close proximity to each other in a memory structure of the data processing system.

17 Claims, 9 Drawing Sheets

(56) References Cited

OTHER PUBLICATIONS

Levine, F. et al., "A Programmer's View of Performance Monitoring in the PowerPC Microprocessor", IBM Journal of Research and Development, 41(3), 1997, pp. 345-356.

Petrank, Erez et al., "The Hardness of Cache Conscious Data Placement", POPL, 2002, pp. 101-112.

Pospiech, Christoph, "Hardware Peformance Monitor (HPM) Toolkit", http://www.idris.fr/su/Scalaire/vargas/hpm/HPM_ug.html, 2004, 36 pages.

Schneider, Florian T. et al., "Online Optimizations Driven by Hardware Performance Monitoring", Programming Language Design and Implementation (PLDI), 2007, 10 pages.

Shuf, Yefim et al., "Characterizing the Memory Behavior of Java Workloads: A Structured View and Opportunities for Optimizations", Measurement and Modeling of Computer Systems (SIGMETRICS), 2001, pp. 194-205.

Shuf, Y et al., "Creating and Preserving Locality of Java Applications at allocation and garbage collection times", Object-Oriented Programming, Systems, Languages and Applications (OOPSLA), 2002, 13 pages.

Shuf, Y et al, "Exploiting Prolific Types for Memory Management and Optimization", POPL 2002, pp. 295-306. 2002, pp. 295-306.

Siegwart, David et al., "Improving Locality with Parallel Hierarchical Copying GC", International Symposium on Memory Management (ISMM), 2006, pp. 52-63.

Somogyi, Stephen et al., "Spatial Memory Streaming", Proceedings of the 33rd International Symposium on Computer Architecture (ISCS '06), 2006, 12 pages.

Tikir, Mustafa M. et al., "NUMA-Aware Java Heaps for Server Applications", International Parallel and Distributed Processing Symposium (IPDPS), Apr. 2005, pp. 1-10.

Zhuang, Ziaotong et al., "Accurate, Efficient, and Adaptive Calling Context Profiling", PLDI, 2006, pp. 263-271.

Serrano, Mauricio J. et al., "Placement Optimization Using Data Context Collected During Garbage Collection", International Symposium on Memory Management, ISSM'09, Jun. 19-20, 2009, 10 pages.

"Workload description", IBM, http://publib.boulder.ibm.com/infocenter/lnxinfo/v3r0m0/index.jsp?topic=/liaag/pubdb2c/p..., Accessed online Sep. 17, 2010.

Adl-Tabatabai, Ali-Reza et al., "Prefetch Injection Based on Hardware Monitoring and Object Metadata", PLDI '04, Jun. 9-11, 2004, pp. 267-276.

Ammons, Glenn et al., "Exploiting Hardware Performance Counters with Flow and Context Sensitive Profiling", Programming Language Design and Implementation (PLDI), 1997, 12 pages.

Arnold, Matthew et al., "Approximating the Calling Context Tree via Sampling", IBM Research Report, Jul. 7, 2000, 11 pages.

Bacon, David F. et al., "Compiler Transformations for High-Performance Computing", ACM Computing Surveys, vol. 26, No. 4, Dec. 1994, pp. 345-420.

Cahoon, Brendon et al., "Data Flow Analysis for Software Prefetching Linked Data Structures in Java", Parallel Architectures and Compilation Techniques (PACT), 2001, 12 pages.

Calder, Brad et al., "Cache-Conscious Data Placement", ASPLOS VIII, 1998, pp. 139-149.

Chen, Wen-Ke et al., "Profile-Guided Proactive Garbage Collection for Locality Optimization", PLDI '06, Jun. 10-16, 2006, pp. 332-340.

Cheney, C.J., "A Nonrecursive List Compacting Algorithm", Communications of the ACM (CACM), 13(11), 1970, pp. 677-678.

Chilimbi, Trishul M. et al., "Dynamic Hot Data Stream Prefetching for General-Purpose Programs", Programming Language Design and Implementation (PLDI), Jun. 17-19, 2002, pp. 199-209.

Chilimbi, Trishul M. et al., "Using Generational Garbage Collection to Implement Cache-Conscious Data Placement", International Symposium on Memory Management (ISMM '98), Oct. 1998, pp. 37-48.

Grcevski, Nikola et al., "Java Just-In-Time Compiler and Virtual Machine Improvements for Server and Middleware Applications", Proceedings of the Third Virtual Machine Research and Technology Symposium, VEE, May 6-7, 2004, 13 pages.

Hirzel, Martin et al., "Bursty Tracing: A Framework for Low-Overhead Temporal Profiling", 4th ACM Workshop on Feedback-Directed and Dynamic Optimization (FDDO-4), Dec. 2001, pp. 1-10.

Hirzel, Martin et al., "Connectivity-Based Garbage Collection", Object-Oriented Programming, Systems, Languages and Applications (OOPSLA), Oct. 26-30, 2003, pp. 359-373.

Huang, Xianglong et al., "The Garbage Collection Advantage: Improving Program Locality", OOPSLA '04, Oct. 24-28, 2004, pp. 69-80.

Ibrahim, Ali et al., "Automatic Prefetching by Traversal Profiling in Object Persistence Architectures", European Conference for Object-Oriented Programming (ECOOP), 2006, pp. 1-24.

* cited by examiner

DATA PLACEMENT OPTIMIZATION USING DATA CONTEXT COLLECTED DURING GARBAGE COLLECTION

BACKGROUND

The present application relates generally to an improved data processing apparatus and method and more specifically to mechanisms for performing data placement optimization using data context information collected during garbage collection operations.

Data context information represents object reference patterns during the execution of a program. Data context information provides valuable information for program understanding, performance analysis, and runtime optimizations. For object oriented applications, numerous objects are created, among which complicated reference patterns may occur. Therefore, data context information is very important for program understanding and optimizations.

However, building data context information can be very expensive given the fact that (1) data accesses are highly frequent (a program can access a huge number of objects in a short period of time); and (2) the access patterns among objects are complex. Therefore, it is desirable to establish a program paradigm that can collect such information efficiently. Sacrificing some accuracy is affordable as long as enough information is available for the purpose of program understanding and optimization.

SUMMARY

In one illustrative embodiment, a method, in a data processing system, is provided for data placement optimization during runtime of a computer program. The method comprises detecting, by a processor of the data processing system, cache misses in a cache of the data processing system. The method further comprises collecting, by the processor, cache miss information for objects of the computer program. Moreover, the method comprises generating, by the processor, data context information for an object in an object access sequence of the computer program. The data context information identifies one or more additional objects that may be accessed as part of the object access sequence in association with the object. Furthermore, the method comprises correlating, by the processor, the cache miss information with the data context information of the object. In addition, the method comprises performing, by the processor, data placement optimization on the object, in the object access sequence, with which the cache miss information is associated. The data placement optimization places connected objects in the object access sequence in close proximity to each other in a memory structure of the data processing system.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
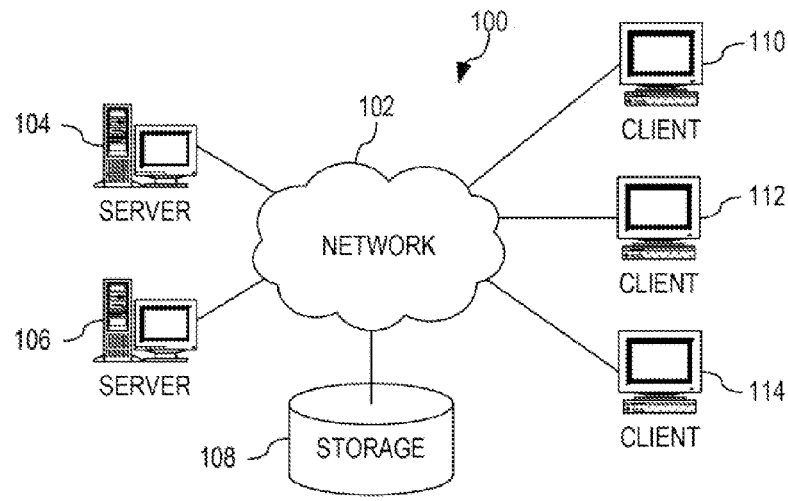
FIG. 1 is a pictorial representation of an example distributed data processing system in which aspects of the illustrative embodiments may be implemented.

The illustrative embodiments provide mechanisms for performing data placement optimization using data context information collected during garbage collection operations. In some illustrative embodiments, the mechanisms of the illustrative embodiments combine the collection of data context information with commonly used garbage collectors in a virtual machine environment in order to make the overhead of getting data context information negligible. The garbage collector generates extra runtime information for the building of data contexts. To save memory space, and also the time spent on retrieving the data, a concise representation is provided that sacrifices a small amount of accuracy to achieve such cost savings.

In some illustrative embodiments, the mechanisms of the illustrative embodiments utilize a technique in which data cache miss sampling is performed to determine ways to improve locality in a generational garbage collector. Many programs spend a large number of processor cycles in data stalls (cache and translation lookaside buffer (TLB) misses). Thus, techniques to reduce these data stalls are important. Locality of data may be one factor in determining how to reduce such stalls. Locality of data access is partially determined by the placement of objects in the memory heap. If accessed objects reside on the same cache line or page of memory, it is more likely that the number of memory accesses is reduced, thus improving performance by reducing data stalls.

The mechanisms of the illustrative embodiments provide a way in which to model the data placement problem with regard to locality in terms of space-efficient data structures. The mechanisms of the illustrative embodiments further provide techniques to collect data context information for object oriented programs. Moreover, the mechanisms of the illustrative embodiments are able to perform such collection of data context information in tandem with a garbage collector and garbage collection operations. Furthermore, the mechanisms of the illustrative embodiments provide ways in which to scale down accuracy of these mechanisms in favor of lower overhead by capturing and storing partial access sequences organized into a tree structure. In addition, the mechanisms of the illustrative embodiments perform a runtime data placement optimization based on the data context information that is collected.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
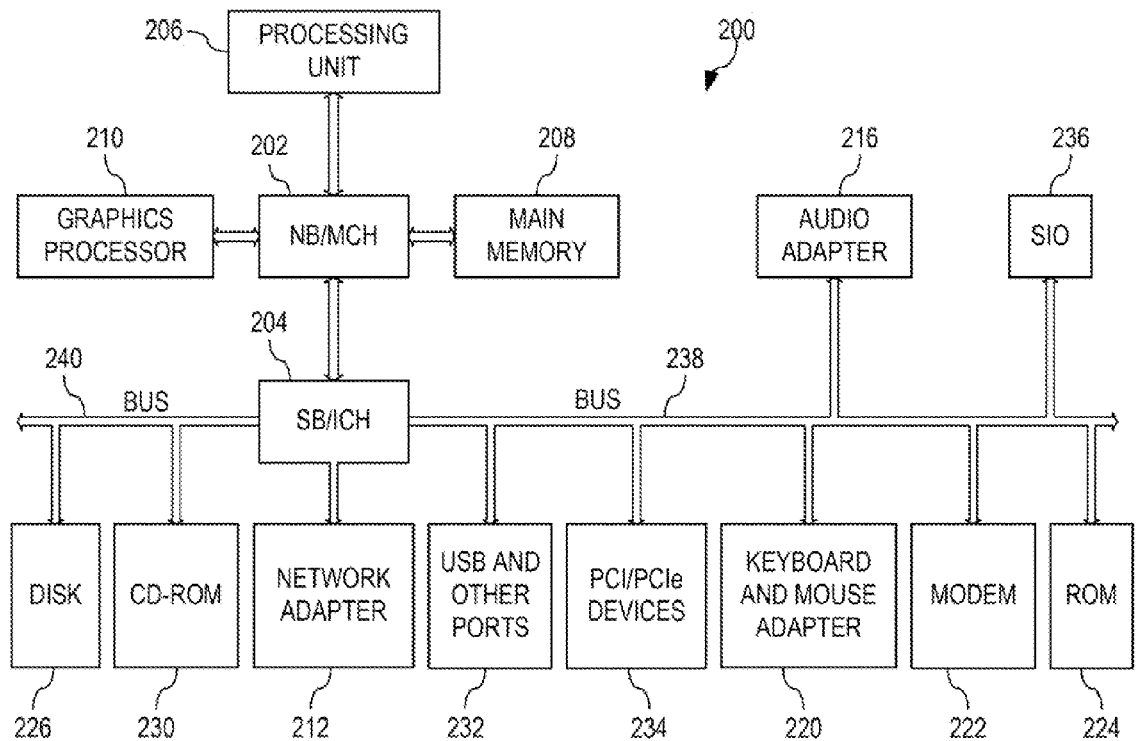
FIG. 2 is a block diagram of an example data processing system in which aspects of the illustrative embodiments may be implemented.

The illustrative embodiments may be utilized in many different types of data processing environments including a distributed data processing environment, a single data processing device, or the like. With reference now to the figures, and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/I (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System P® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

As mentioned above, the mechanisms of the illustrative embodiments, which may be implemented in one or more of the data processing devices, systems, or environments shown in FIGS. 1-2 or other similar environments, devices, or systems, operate to collect data context information during garbage collection performed by one or more garbage collectors of these data processing devices, systems, or environments. Moreover, the mechanisms of the illustrative embodiments perform data placement optimization operations based on this collected data context information.

Data context information is the sequence of objects that are accessed from one object to the next during the execution of a computer program. This data context information can be determined by analyzing the dynamic object reference trace and can be represented in multiple ways. For example, a data context graph (DCG) may be used to abstract each object type as a node in a tree structure. Directed edges connecting two nodes are used to indicate reference sequences through a particular field of one object type to the other object type.

Figure 3A:
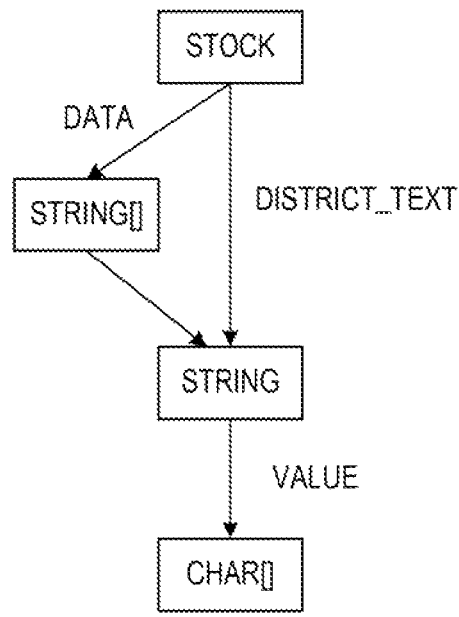
FIG. 3A is an example of a data context graph in accordance with one illustrative embodiment.

An example of a data context graph (DCG) is shown in FIG. 3A. As shown in FIG. 3A, there are four object types: Stock, String[ ], String, and Char[ ]. An edge labeled "data" from Stock to String[ ] means that data is a field of Stock which points to a string array. The program code first accesses the Stock object and then the field "data" of the Stock object to access the string array object String[ ]. Similarly, other accesses are Stock to String through the "district_text" field and String to Char[ ] through the "value" field.

The DCG is a compact representation of data contexts. However, it is difficult to discern some access sequences through the same object type because accesses to the same object types are merged together. In other words, due to the fact that each object type is only represented by one node, significant information about the data context is lost. This can be a troublesome problem for many object oriented programs where many popular object types occupy the majority of the object or memory heap space, e.g., String, Object[ ], Vector, HashTable, etc.

Figure 3B:
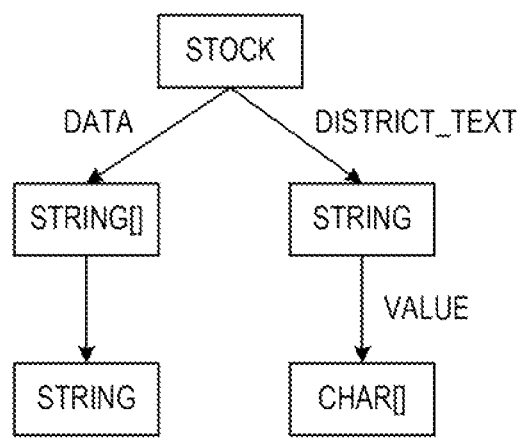
FIG. 3B is an example of a data context tree in accordance with one illustrative embodiment.

The complete context information can be kept by storing the entire object access sequence. However, this is very expensive because the object access sequence can be very long and is proportional to the total number of objects accessed. To maintain sufficient data access information while reducing the size of the stored context data, a data context tree (DCT) can be used. A DCT is a succinct summary of the object access sequence. FIG. 3B is an example of a DCT.

As shown in FIG. 3B, with a DCT, the tree of the DCT starts with a root node (a static or stack object). Each node represents a possible object access sequence from the root node. Each edge is marked with the particular field that is linked to the child object type from the parent object type. For each parent node, duplicate children are merged, i.e. the field on each edge must be different.

It can be seen in FIG. 3B that there are two nodes for object type String, because these nodes are accessed through different contexts. From FIGS. 3A and 3B it can also be seen that the difference between a data context graph (DCG) and a data context tree (DCT), although they stand for the same object access sequence. The DCG eliminates the data context information that the object Char[ ] is not accessed for the object String accessed from the sequence starting from data. It should be noted that, in either the DCG or DCT representations, the array index for the array accesses in String[ ] or Char[ ] are not maintained since that would lead to an explosion in the number of nodes in the graph.

One way to build data context information is to instrument each memory access of the program code. This is too expensive, in terms of processor cycles and memory resources required to maintain the data context information, to be realistic in most cases. Rather than performing such extensive instrumenting of the program code, the illustrative embodiments build a tree representation, such as a DCT, by utilizing information gathered during garbage collection operations. During garbage collection, object access sequences are processed to find live objects. This provides a natural way to find the data context relevant to the objects.

Although garbage collection is only done occasionally, it still provides valuable information for those hot object access sequences, i.e. object access sequences that occur frequently. Hot object access sequences are more important to investigate and optimize since they have a larger impact on the overall performance of the program code. Based on the DCT built up using the garbage collection operations, the mechanisms of the illustrative embodiments may further perform data placement optimization to increase the performance of the code, such as these hot object access sequences in the program code.

One of the largest advantages of combining the building of a DCT representation of data context information with garbage collection is that the cost of building the DCT representation is relatively low. Most operations can be shared with the garbage collector. Thus, only small additional cost is required for those operations that cannot be shared, thereby making the mechanisms of the illustrative embodiments suitable for online, or runtime, optimizations.

The mechanisms of the illustrative embodiments may be utilized with various types of garbage collectors including mark-and-sweep garbage collectors, generational or tracing garbage collectors, and the like. As is generally known in the art, when computer programs execute, they allocate memory for data buffers. When the computer program continues to allocate such memory, it may eventually exceed the physical memory capacity. In such a situation, the operating system must place portions of the program in virtual memory, i.e. on disk, in order to continue executing, which slows down execution of the computer program. Manually de-allocating memory after a routine no longer needs that portion of memory is a tedious task which programmers often forget to do, or do not do properly.

As an alternative to manual de-allocation of memory, garbage collection was developed. Garbage collection is the use of a software routine that searches memory for areas of inactive data and instructions in order to reclaim that space for the general memory pool, i.e. the heap. A garbage collector basically works by determining what data objects in a program will not be accessed in the future execution of the program, and reclaiming storage used by those objects. Garbage collection automates the freeing up of memory so that the programmer no longer has to worry about releasing objects that are no longer needed. As a result, this source of considerable program design effort may be avoided. Moreover, garbage collection aids in making programming languages safer due to the reduction in several classes of runtime errors, e.g., dangling pointer errors where a reference to a de-allocated object is used.

Many computer programming languages, referred to as garbage-collected languages, now require garbage collection either as part of the language specification (e.g., Java, C#, and most scripting languages) or as part of practical implementation (e.g., formal languages like lambda calculus). Other computer programming languages are designed for use with manual memory management, but have garbage collected implementations (e.g., C, C++). Still other computer programming languages, such as Modula-3, allow both garbage collection and manual memory management to co-exist in the same application by using separate heaps for collected and manually managed objects.

Tracing garbage collectors, also known as generational garbage collectors, are the most common type of garbage collector. Tracing garbage collectors focus on determining which objects are reachable, or potentially reachable, and then discarding all remaining objects. A reachable object may be defined as a data object for which there exists some name, e.g., a variable or the like, in the program environment that leads to it, either directly or through references from other reachable data objects. More precisely, data objects, hereafter referred to as simply "objects," can be reachable in only two ways. First, a distinguished set of objects are assumed to be reachable, these are known as the roots. Typically, these include all the objects referenced from anywhere in the call stack, i.e. all local variables and parameters in the functions currently being invoked, and any global variables. Second, anything referenced from a reachable object is itself reachable. This is referred to as transitivity.

Tracing garbage collectors use an algorithm in which they perform garbage collection cycles. A cycle is started when the collector decides, or is notified, that it needs to reclaim storage, which in particular happens when the system is low on memory. All tracing garbage collectors implement some variant of the tri-color marking abstraction, but simple collectors, such as the mark-and-sweep collector, often do not make this abstraction explicit. Tri-color marking works as follows.

First, initial white, grey and black sets are created that will be used to maintain progress during the cycle. Initially, the white set, or condemned set, is the set of objects that are candidates for having their memory recycled. The black set is the set of objects that can be easily proven to have no references to objects in the white set. In many implementations the black set starts off empty. The grey set is all the remaining objects that may or may not have references to objects in the white set. These sets partition memory such that every object in the system, including the root set, is in precisely one set.

Thereafter, an object in the grey set is selected. This object is blackened, i.e. moved to the black set, by "greying" all the white objects it references directly, i.e. blackening all the white objects that the object references and objects that they reference. This step is repeated until the grey set is empty. When there are no more objects in the grey set, then all the objects remaining in the white set are provably not reachable and the storage occupied by them can be reclaimed.

With the tri-color marking algorithm, no black object points directly to a white object. This ensures that the white objects can be safely deallocated once the grey set is empty. The movement between sets may be achieved by a copying procedure, for example, such as described in C. J. Cheney "A Nonrecursive List Compacting Algorithm," Communications of the ACM (CACM), 13(11), 1970, for example.

Once the unreachable set, i.e. the resulting white set when the grey set is empty, has been determined, the garbage collector may simply release the unreachable objects and leave everything else as it is. Alternatively, the garbage collector may copy some or all of the reachable objects into a new area of memory, updating all references to those objects as needed. These are called "non-moving" and "moving" garbage collectors, respectively.

Tracing collectors may also be categorized by considering how the three sets of objects (white, grey, and black) are maintained during a collection cycle. The most straightforward approach is the semi-space collector, which is a moving or copying garbage collection scheme in which memory is partitioned into a "from space" and "to space". Initially, objects are allocated into "to space", until it becomes full and a garbage collection cycle is triggered. At the start of the garbage collection, the "to space" becomes the "from space", and vice versa. The objects reachable from the root set are copied from the "from space" to the "to space". These objects are scanned in turn, and all objects that they point to are copied to "to space" until all reachable objects have been copied to "to space". Once the program continues execution, new objects are once again allocated from the "to space" until it is once again full and the process is repeated. This approach has the advantage of conceptual simplicity, since the three object color sets are implicitly constructed during the copying process, but the disadvantage that a very large contiguous region of free memory may possibly be needed on every collection cycle.

In general, a mark-and-sweep garbage collector maintains one or two bits with each object to record whether it is white or black, thereby generating a white set list and a black set list. The grey set is either maintained as a separate list or is identified using another bit. As the reference tree is processed during a collection cycle, these bits are manipulated by the collector to reflect the current state, i.e. white, black, or grey. The mark-and-sweep strategy has the advantage that, once the unreachable set is determined, i.e., the resulting white set after the grey set is empty, either a moving or non-moving collection strategy can be pursued. This choice of strategy can even be made at runtime, as available memory permits.

In some implementations of garbage collectors, the mark-and-sweep garbage collector uses an explicit stack to store objects which are known to be reachable, but whose contents have not yet been examined (i.e. the "grey" objects). Each entry in the stack contains a base address and a mark descriptor, indicating the location of possible pointers relative to that starting address. Mark descriptors typically take the form of either a simple length specification, or a bit vector describing pointer locations.

Many implementations of the mark-and-sweep garbage collector employ a work list used to store object pointers to be scanned. The basic procedure involves using a marking thread to retrieve objects from the work list, scan them for pointers, and store them into another work list to be used by a marking thread later.

Regardless of which type of garbage collector is used in the particular system, the mechanisms of the illustrative embodiments utilize the fact that the garbage collector gathers information about the objects and their access patterns, e.g., the relationships between objects during execution of a program, to generate data context information and a data context representation, such as a data context tree, data context graph, or the like.

For example, with the mark-and-sweep type of garbage collector, given the existence of work lists, the mechanisms of the illustrative embodiments keep track of data context information by adding extra information to the work lists, as described hereafter. In this manner, an entry in the work list provides the pointer to the object and its associated data context pointer. When the objects are being scanned, the data context information of their child objects are computed. This information is stored into the work list. Furthermore, the data context information can be computed incrementally because it is a function of the data context of its parent node, the field being accessed, and the object type of the child object:

Data_Context(child)=Data_Context(parent)+(field accessed,type of child).

Referring again to the tracing, or generational, garbage collectors, one advantage of these garbage collectors over the mark-and-sweep garbage collectors is that a separate work list is not needed to keep track of the garbage collector's progress, thus saving space but at the cost of additional complication. With the illustrative embodiments, to keep track of the data context information, extra information is stored in either the old object (from-space) or the new object (to-space). The mechanisms of the illustrative embodiments may exploit the fact that the old object is no longer needed and the monitor field, i.e. a field in the header of the objects indicating that the object is locked for use by a particular thread, of most objects is null, as few objects remain locked during garbage collection.

With the garbage collection mechanisms described above, it is important to store the data context information of grey objects. In order to do so, with the mechanisms of the illustrative embodiments, if the object monitor field of the header of an object is zero, a data context pointer to its data context information is stored in the object monitor field and the least significant bit of the monitor field is turned to a predetermined data context information value, e.g., 1. The least significant bit can be reused for setting this data context information value since pointers are typically aligned to the word boundary. If the object monitor field is non-zero, the monitor field is used to store a pointer to the old object (the object in the from-space) with the data context information being stored in the old object.

It should be noted that this particular illustrative embodiment is only one way in which data context information may be stored in accordance with the present invention. This particular way of storing data context information was chosen in order to offset the overhead introduced by the data context generation functionality introduced into garbage collection operations by the mechanisms of the illustrative embodiments. That is, by storing the data context information in either the object monitor field of the new object during garbage collection, or in the old object that will be recycled by the garbage collection, it is not necessary to have an additional data structure, locate the additional data structure, locate an entry within the data structure, etc., when retrieving the data context information for an object. To the contrary, the mechanisms of the illustrative embodiments can utilize the existing relationships between the old and new objects to generate the linkage with the data context information. This makes the garbage collection operation more efficient with regard to the number of processing cycles required to perform the garbage collection in view of the added overhead introduced by the data context generation operations of the illustrative embodiments.

Moreover, typically during garbage collection, the object monitor field will be zeroed since there will not be a lock on the object at the time of garbage collection and thus, the majority of the time the data context will be stored in the object monitor field of the new object. However, in the relatively small cases where the monitor filed of the new object is not zeroed, the old object itself can serve as the container for the data context information with the monitor field of the new object storing the pointer to the old object. While this is one way of storing data context information, the scope of the present invention is intended to encompass other ways of storing the data context information including generating a separate data structure and using it to store the data context information. In such a case, the old or new objects may be used to store pointers to the separate data structure, entries within the separate data structure, or the like. Alternatively, these pointers themselves may be stored in a pointer data structure separate from the old and new objects. Any configuration deemed appropriate for storing data context information may be used without departing from the spirit and scope of the present invention.

When the object is scanned and is placed in the black set list, i.e. the set of objects that have been scanned and analyzed, as part of the garbage collection operation, the data context pointer is retrieved from either the object monitor field or the old object, depending upon the setting of the least significant bit of the object monitor field of the object, and is used to compute the data context of the object's child objects, as will be described in greater detail hereafter. The data context information for the object and its child objects may then be used to generate a data context tree or graph representation of the access pattern for the object. These representations may then be used, as described hereafter, to optimize data placement.

After scanning the object and retrieving/computing the data context information, the object monitor field of the object may be restored. For example, if the least significant bit of the object monitor field is the predetermined value, e.g., 1, the monitor field is restored to zero. If the least-significant bit of the object monitor field is not the predetermined value, e.g., 0, then the monitor field is restored from the old object. That is, the old object is an old copy of the new object during garbage collection and thus, has the old state of the object monitor field stored within it. Even if the old object is used to store the data context information, the object monitor field of the old object is maintained so that it can be used to restore the object monitor field of the new object should that become necessary.

As touched on above, a complete data context tree or data context graph gives the most complete context information, however it can be very large for many programs. Also, the complexity of manipulating a large data context tree or graph grows tremendously. The size of the data context tree or graph is reasonable for small benchmarks, however it becomes unmanageable for complex programs. Thus, it is important to develop techniques to reduce the size of the data context tree or graph representation.

In one illustrative embodiment, partial data context tree (DCT) representations are utilized rather than utilizing a complete data context tree representation. A partial data context tree (PDCT) is a subtree taken from the full data context tree with a limited (preset) maximum depth. It has been recognized that for many cases, it is actually not necessary to get the full data context for each object type. In such circumstances, partial DCTs, which are much smaller and easier to process, can be used instead, thereby making the mechanisms of the illustrative embodiments more suitable for runtime optimizations, such as runtime optimization of data placement.

Figure 4:
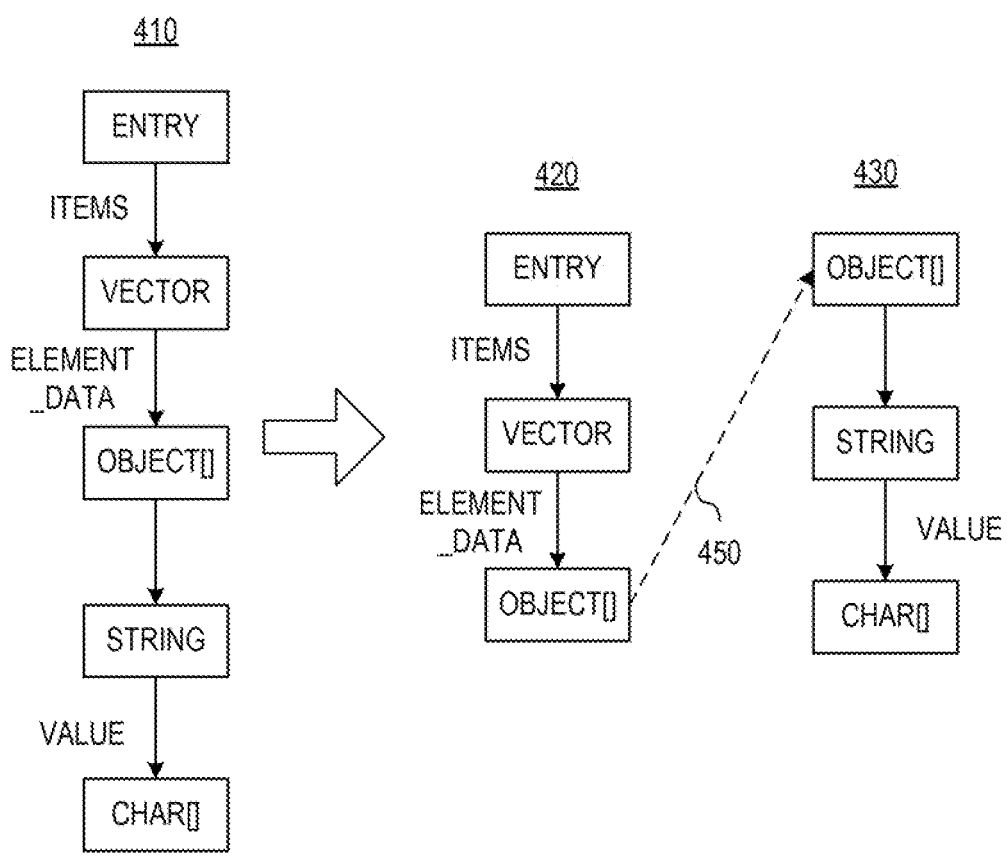
FIG. 4 is an example diagram illustrating a conversion of a full data context tree to a plurality of partial data context trees (PDCTs) in accordance with one illustrative embodiment.

FIG. 4 is an example diagram illustrating a conversion of a full data context tree to a plurality of partial data context trees (PDCTs) in accordance with one illustrative embodiment. Assume that the depth of PDCTs is preset to a depth of 3. As shown in FIG. 4, with a depth of 3, the DCT 410 is split into partial DCTs 420-430 each having a depth of 3. Whenever a PDCT 420-430 reaches a depth of 3, it is automatically connected to a new partial DCT. A twin edge link 450 is marked indicating the relationship between two PDCTs 420 and 430. Duplicate PDCTs are merged, therefore one PDCT may represent several identical subtrees that are located at different places on the full DCT. It can be seen that the PDCTs can be built directly by the garbage collector where when the maximum depth of the PDCT is reached, another PDCT creation is triggered if the PDCT does not already exist.

Thus, with the mechanisms of the illustrative embodiments, the garbage collectors are augmented to utilize the object monitor fields of objects, or the old objects in the "from space" to store the data context information for the object that is gathered during the garbage collection operation. The object monitor fields of the objects may have flags set, such as in the least significant bits, indicating whether the data context information is stored in the object monitor field itself or in the old object. Based on this flag's setting, the data context information may be retrieved for use in performing an optimization of data placement. The data context information itself may be minimized by using partial data context tree representations that have a predetermined depth.

As mentioned above, the data context information built up during garbage collection using the mechanisms of the illustrative embodiments may be used to perform runtime optimizations of a program's execution. One type of runtime optimization that is made possible by the mechanisms of the present invention is data placement optimization. The data placement optimization takes data cache miss information from hardware performance counters in the processor(s) of the data processing system, and combines this cache miss information with the partial DCTs built during garbage collection. Data cache misses from objects are marked on the partial DCTs. Thereafter, logic operates to make decisions for placement of objects in the memory heap based on the partial DCTs that have the marked objects where data cache misses occur.

Figure 5:
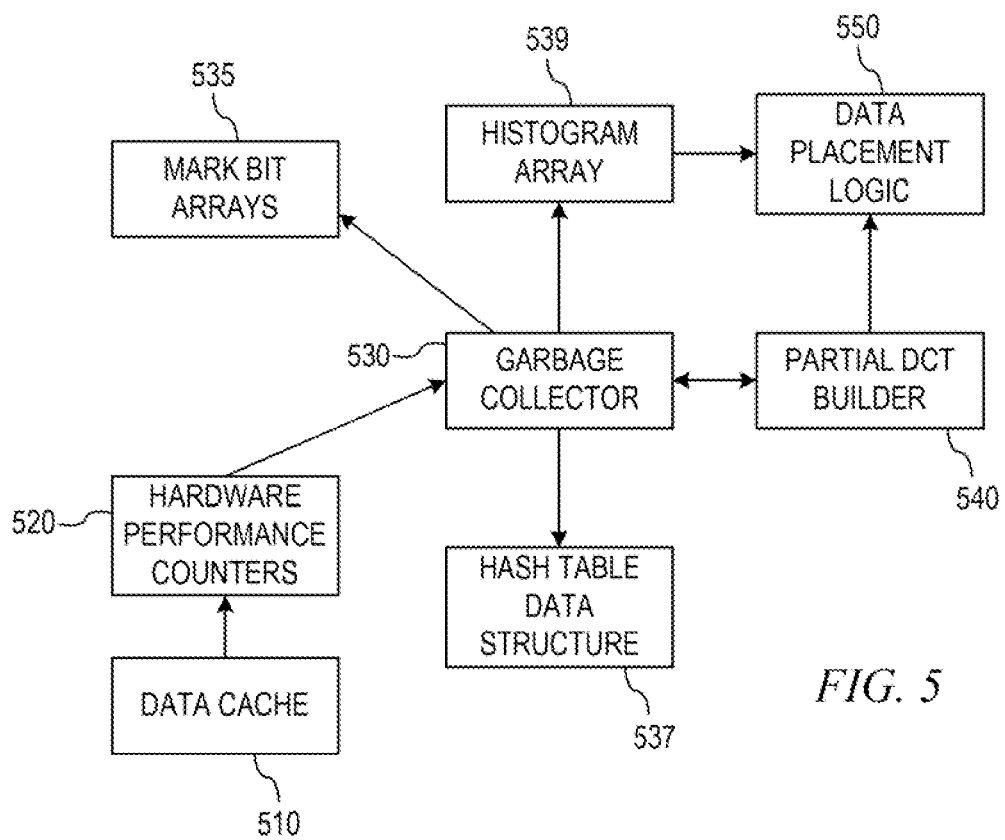
FIG. 5 is an example diagram of the primary operational components for performing runtime data placement optimizations in accordance with one illustrative embodiment.

FIG. 5 is an example diagram of the primary operational components for performing runtime data placement optimizations in accordance with one illustrative embodiment. The elements shown in FIG. 5 may be implemented in hardware, software, or any combination of hardware and software, in one or more data processing systems. For example, in one illustrative embodiment, the data cache 510 and hardware performance counters 520 are implemented in hardware of one or more processors of a data processing system while the garbage collector 530, partial DCT builder 540, and data placement logic 550 are implemented as software instructions executing on one or more processors of the data processing system, or a different data processing system from that in which the data cache 510 and hardware performance counters 520 are provided. Alternatively, all of the elements may be implemented in hardware of the same or different processors of the same or different data processing systems, or may make use of some type of hardware based acceleration.

As shown in FIG. 5, the primary operational elements include a data cache 510, hardware performance counters 520, a garbage collector 530, a partial DCT builder 540, and data placement logic 550. The hardware performance counters 520 collect data cache miss information from the data cache 510 using, for example, sampling on a periodic basis. For example, the hardware performance counters 520 may be incremented after a predetermined number of data cache misses occur in the data cache 510. Hardware performance counters are generally known in the art and thus, a more complete explanation is not included herein. Essentially, the hardware performance counters 520 count the occurrence of various events or conditions within the data processing system, or a processor of the data processing system, and these counts may be accessed for obtaining performance information. More information regarding hardware performance counters may be obtained from F. Levine, "A Programmer's View of Performance Monitoring in the PowerPC Microprocessor," IBM Journal of Research and Development, 41(3), 1997.

Each sample of data cache misses may contain the instruction address, the data address of the data cache miss, and the thread identifier (SIAR, SDAR, TID). This information is collected before a garbage collection operation starts. The garbage collector 530 then processes a batch of samples and provides this data access patterns associated with the samples to the partial DCT builder 540. The processing of the batch of samples involves identifying objects from the data address of the data cache miss and creating a hash table data structure 537 containing all the object samples.

The partial DCT builder 540 generates or retrieves the relevant PDCT where data cache misses have happened. During garbage collection based on the data cache misses, if an object is found in the hash table data structure 537, a data cache miss count associated with a corresponding node in a corresponding PDCT is incremented. The partial DCT builder 540 may annotate the PDCTs to include the data cache miss information, e.g., the data cache miss count, by marking nodes in the PDCTs corresponding to the objects associated with data cache misses with this information. After a training period, the partial DCT builder 540 may provide the PDCTs annotated with the data cache miss information to the data placement logic 550 which analyzes the annotated PDCTs to determine a more optimal data placement to reduce data cache misses. That is, data cache misses tend to happen in connected data structures. Thus, the data placement optimization seeks to put connected objects, i.e. objects that are linked to one another via references from one object to another both directly and/or indirectly, with one another in close proximity to each other in the memory in order to achieve better reuse and thereby reduce data cache misses. The data placement logic 550 implements a data placement model, described hereafter, to make such decisions as to data placement.

Since a data cache miss may happen in the middle of an object, the garbage collector 530 may use the mark bit arrays 535 of the garbage collector, in a mark-and-sweep type garbage collector, for maintaining allocations to find the beginning of the object, by walking backwards until a corresponding mark bit in a mark bit array is found. That is, there may be a mark bit associated with predefined portion of the memory heap, e.g., a mark bit for every 2 words, such that the setting of the mark bit in the mark bit array denotes the start of an object in the memory. If a data cache miss occurs between these set mark bits, i.e., within an object, the mark bit array may be walked backwards until a set mark bit is found which denotes the beginning of the corresponding object. The processed samples are stored in the hash table data structure 537 which contains the object addresses for the data cache misses and the number of misses for each particular object, i.e. the data cache miss counts. Alternatively, spare bits in the object header can be used to mark the object where one or more data cache misses happen.

When the garbage collector 530 finds live objects, it also checks the hash table 537. If the object misses in the data cache, i.e. there is a data cache miss associated with the object, its corresponding node in the PDCT is marked, e.g., by incrementing a data cache miss counter value associated with the node. This information is then used, as described hereafter, by the data placement logic 550 to make data placement determinations.

The data placement logic 550 may utilizes various data placement models to make data placement determinations based on the data cache miss information gathered during runtime execution of the computer program as well as the PDCTs generated by the garbage collector 530 during garbage collection. The data placement logic 550 uses information obtained from the hardware performance counters 520 when determining data placement. Such data placement may be performed during garbage collection by the garbage collector 530, for example, to place objects in a memory heap, the data cache, or the like, so as to reduce data cache misses in continued or future executions of the program code.

Hereafter, various data placement strategies and logic will be described as examples of ways in which data placement may be performed to achieve such results. However, these data placement strategies and logic are only examples and are not intended to limit the types of strategies or logic that may be used with the mechanisms of the illustrative embodiments. To the contrary, the illustrative embodiments are intended to cover any implementation in which cache miss information is combined with a hierarchical representation of a object access sequences, e.g., a DCG, DCT, PDCT, or the like, generated during garbage collection to determine areas of the hierarchical representation of object access sequences where data placement optimization should occur. The data placement optimization may then be achieved in any manner suitable to reduce cache misses.

Data cache misses tend to occur in connected objects, i.e. objects that access one another via either direct or indirect references from one object to another. If an object misses in the data cache, objects referenced by that object might miss in the data cache also if they are referenced by the original object that missed in the data cache. This data cache miss behavior is difficult to capture with conventional hardware stream prefetch mechanisms because this behavior involves only a few cache lines, typically not enough for a hardware mechanism to trigger. The mechanisms of the illustrative embodiments utilize heuristics for object placement decisions such that connected objects are placed close to each other, with regard to address ranges, in the memory heap for better cache line utilization.

It is important to note that data cache miss information may give an incomplete picture about data cache misses in a connected data structure. For example, if object B is already placed next to object A in the same cache line, one may not get data cache misses for object B even though object B is reference from object A. The mechanisms of some of the illustrative embodiments adopt a training approach to overcome these problems. In these illustrative embodiments, a tracing or generational garbage collector is utilized such that objects are copied a few times before they are tenured. Thus, this copying provides a basis for performing training of the costs models used by the data placement logic 550 when determining whether a particular object's placement should be modified. That is, if the data placement model makes a wrong placement decision for object B, eventually object B data cache misses will start to appear. After several training phases, the data placement model will correct itself based on the appearance of these data cache misses associated with object B.

Typically, the first object in a data access sequence will show more data cache misses while connected objects referenced from this first object may show fewer data cache misses. The garbage collector 530 can also give relative information about the number of the objects for the referenced objects, for example that there are the same number of objects B as objects A, indicating a 1:1 mapping, different numbers of objects B and A, indicating an x:y mapping, or the like. For example, if a 1:1 mapping is identified, it is indicative of a situation where it is desirable to have the objects B and A placed in memory in close proximity to each other, e.g., in adjacent address ranges or memory fields. If a one to many or many to many relationship between the objects is identified, then it is not known whether such data placement will result in a significant performance benefit. Thus, in the data placement model, the number of data cache misses in connected objects is less important than the connected structure itself. However, the number of data cache misses in the first object is a strong indicator that the connected structures, i.e. the connected objects, are important for data placement optimization.

To integrate a data placement model into the data placement logic 550, the following terminologies are defined to help understand the data placement model. A "node miss rate" is the percentage ratio of the number of data cache misses caused by objects represented as a single node on the PDCT divided by the total number of data cache misses. A "delinquent node" is a node in the PDCT that has a node miss rate that is higher than an established delinquency threshold, e.g., the number of data cache misses associated with an object is at least 1% of the total number of data cache misses. A "trigger node" is a node of the PDCT which is delinquent but its parent node is not delinquent.

As mentioned above, since the data cache misses are monitored by the hardware performance counters 520, the number of data cache misses for each object is known at runtime. The total number of data cache misses may also be recorded by these hardware performance counters 520. Delinquent nodes are easily calculated based on the data cache misses of the individual objects compared to the total number of data cache misses, as identified in these hardware performance counters 520. Trigger nodes mark the start of a data access sequence of nodes that miss in the data cache. Thus, the data placement logic 550 may process the PDCTs generated by the partial DCT builder 540 for objects associated with data cache misses, and trigger nodes may be identified based on the data cache miss counts associated with the nodes of the PDCTs when compared to the total number of data cache misses. That is, the ratio of data cache misses for a node to the total number of data cache misses may be calculated and compared against the predetermined delinquency threshold to thereby identify delinquent nodes in the PDCTs. Thereafter, based on whether a delinquent node's parent node is also delinquent or not, certain nodes in the PDCTs may be marked as trigger nodes based on the definition of trigger nodes provided above.

With the data placement optimization of the data placement logic 550 of one illustrative embodiment, tree-based placement is applied to scalar objects while a tree and histogram-based placement is applied to array objects when necessary. If the array object is accessed sparsely, objects may also be aligned to the cache line boundary so that fewer cache lines are used for the sequence of connected objects. The tree-based placement and histogram-based placement will now be described in greater detail.

With the tree-based data placement, based on the trigger nodes marked on the PDCT, the objects associated with the nodes of the entire sub-tree rooted on the trigger node in the PDCT are placed close to each other in the memory heap. Nodes are first sorted according to the cumulative counts, i.e. the total number of data cache misses of all nodes in the sub-tree. Nodes associated with sub-trees that have relatively higher cumulative count values are placed in the memory heap in earlier than other nodes having lower relative cumulative count values. This allows the nodes associated with larger numbers of data cache misses to be accessed more quickly in the memory heap since they are closer to the beginning of the memory heap resulting in smaller search times and resources.

In one illustrative embodiment, trigger nodes are selected for data placement optimization using a delinquency threshold of at least 1% of the total number of data cache misses. The connected nodes in the sub-tree of the trigger node will not necessarily each have 1% of the total number of data cache misses, but will have at least some important number of data cache misses. Moreover, additional requirements for selecting a trigger node for data placement optimization may be utilized. For example, an additional requirement that the connected nodes contribute to the total number of data cache misses in some significant way may be utilized, e.g., the total number of data cache misses of the connected nodes must be at least 3% of the total number of data cache misses.

As an example, consider again the example DCT shown in FIG. 3B. If the node "Stock" is marked as a trigger node, all the nodes on the sub-tree of "Stock" will be placed together, i.e. in adjacent address ranges, in the memory heap by the data placement logic 550. The order in which the objects associated with these nodes is copied is determined by the cost analysis. For example, if the sub-tree reference from district_text has a higher number of cumulative data cache misses, then that "String" object will be copied first followed by its corresponding Char[ ] object. Next, the sub-tree rooted at "data" will be copied. Thus, the copy uses a sorted-depth-first approach.

Sometimes, nodes with recursive edges are encountered. Nodes that are not associated with recursive edges are given higher priority during data placement due to the fact that a recursive edge may involve many objects, whereas the number of non-recursive nodes is relatively small and limited. Basically, the data placement function for a non-recursive node is increased by a few times to give higher priority when sorting nodes according to cumulative data cache miss values. In addition, the data placement of recursive nodes stops immediately when the copy cache in the generational or tracing garbage collector is full, thus limiting the number of nodes that can be copied. For example, a small portion of a large recursive data structure will be copied at once. This is important for load balancing in a multi-threaded garbage collector.

With array accesses, one array can have a large number of elements. Treating an array as a whole loses per element information. On the other hand, it is also unrealistic to split an array into its individual elements since this would cause an exponential increase in the number of nodes in the DCT and thus, a large number of PDCTs.

To constrain the size of the PDCTs as well as keep enough array access information, the mechanisms of the illustrative embodiments record data cache miss count information for a part of the array elements on the tree node as extra histogram information of the array in the histogram array storage 539. During garbage collection by the garbage collector 530, if an object type is reached from an array and a data cache miss was found in that object, a data cache miss counter associated with the array element is incremented on the PDCT. In addition, a particular histogram counter for the element in the histogram array storage 539 is incremented for that array object. The histogram counters in the histogram array storage 539 associated with the array object is later used for data placement decisions.

Maintaining a counter for each array element may become costly in terms of memory space and thus, in one illustrative embodiment, only counters for the first n elements is maintained with a subsequent counter being used for the remaining elements of the array, i.e., n+1 counters are maintained for the entire array. Most arrays are small in actual application and thus, a small n is typically sufficient. Moreover, there is not much optimization benefit for large arrays. Moreover, the histogram is only created on demand when there is at least one data cache miss in an object accessed from an array, thereby further saving memory space.

Arrays are typically larger than scalar objects and thus, it is often difficult to benefit from placing them to achieve performance benefits if the number of data cache misses is not high enough. Therefore, a higher threshold for node miss rate is set for array objects. In one illustrative embodiment, an array object is included for data placement optimization when an element of the array accounts for a predetermined amount of all data cache misses recorded in the array object's histogram. This is a secondary requirement to the finding of trigger nodes in the PDCT. That is, in this illustrative embodiment, only if the array object is associated with a trigger node and accounts for a predetermined amount of all data cache misses recorded in the array object's histogram, will the data object be included in the data placement optimization.

For example, when an element of the array object accounts for at least 10% of all data cache misses recorded in the array object's histogram, then the array object is selected for data placement optimization in accordance with the mechanisms of the illustrative embodiments. Thus, if two elements of an array object are determined to be "hot" elements, i.e. they are associated with a large number of data cache misses that each account for 10% or more of the total amount of data cache misses for the array object, the nodes, and thus the objects, associated with these two elements will be placed in close proximity to each other, e.g., in adjacent address ranges or memory regions, in the memory heap by the data placement optimization of the illustrative embodiments. The other nodes/objects will not necessarily be subjected to data placement optimization. Hence, with array objects, the mechanisms of the illustrative embodiments utilize a histogram of data cache misses for the elements of the array object up to n elements, with elements in excess of n being lumped together in one category, as a means for determining which elements of the array are to be included in data placement optimization.

The data placement optimization of the illustrative embodiments aims to maximize the chance that objects are placed together, i.e. in adjacent address ranges or memory regions, in the memory heap. As part of this data placement strategy, objects are properly aligned to the boundary of a cache line of the data cache. This increases the chance that the objects are fetched when a cache line is fetched into the data cache. This is because, for object oriented programs, the average object size tends to be relatively small (often smaller than the cache line size). For example, the cache line size for an IBM PowerPC™ processor is 128 bytes while the average object size is approximately 48 bytes. Therefore, one cache line may store one or more objects. Since object sizes have a non-uniform distribution, data alignment becomes a critical issue when many small objects must be placed in memory.

Many arrays are accessed sporadically, i.e. none of the elements get a data cache miss rate higher than the threshold for consideration during data placement optimization. However, the data cache miss rate of the entire array may still be high enough for it to be included in the data placement optimization. Under such circumstances, the data placement logic 550 attempts to align objects accessed from sparse arrays.

There are three basic requirements, in the illustrative embodiments, to apply sparse array alignment. First, the data cache miss rate of the entire array needs to be above a predetermined threshold, e.g., must be at least 1%. Second, none of the elements may have a data cache miss rate higher than the predetermined threshold. Third, an object node accessed from an array node is a trigger node of a number of connected objects. The data placement optimization starts with objects referenced by the array elements instead of the array itself.

Figure 6:
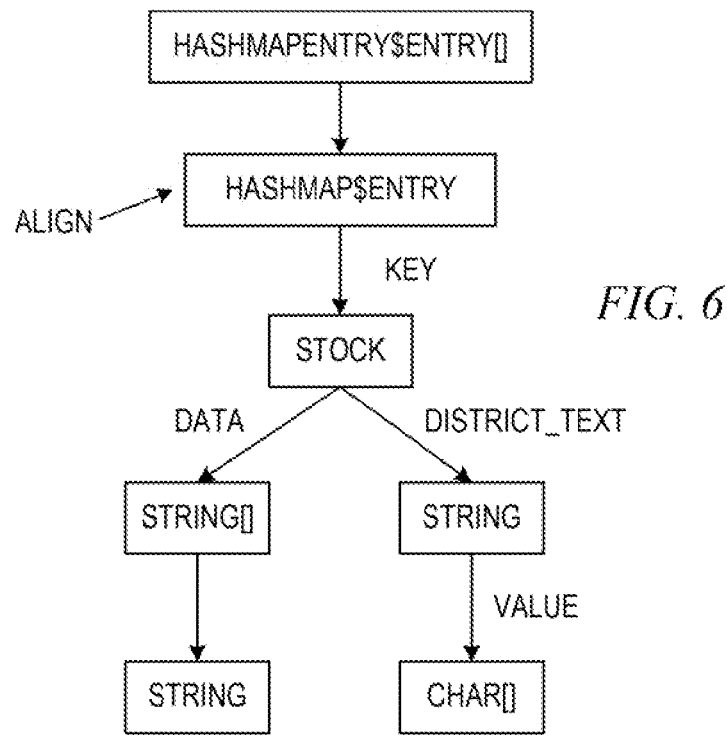
FIG. 6 is an example diagram of a DCT for describing sparse array alignment in accordance with one illustrative embodiment.

For example, assume a DCT as shown in FIG. 6. Assume that HashMap$Entry is the trigger node and is accessed from a sparse array satisfying the above three requirements. The alignment is conducted for each object referenced from the array. In this case, each object of HashMap$entry starts at the boundary of a cache line, all nodes in the sub-tree are placed according to the data placement methodology described above, e.g., tree-based placement, histogram-based placement, or the like.

Thus, the illustrative embodiments provide mechanisms for generating hierarchical representations of object access sequences of a program during garbage collection, correlating these hierarchical representations with performance counter information indicative of cache misses associated with objects, and using the correlated information to perform data placement optimization operations. The mechanisms of the illustrative embodiments utilize memory saving techniques to reduce the amount of memory necessary to achieve these operations, thereby permitting the mechanisms of the illustrative embodiments to operate at runtime. The result of the data placement optimizations of the illustrative embodiments is a reduction in the amount of cache misses and greater performance from the execution of the program.

Figure 7:
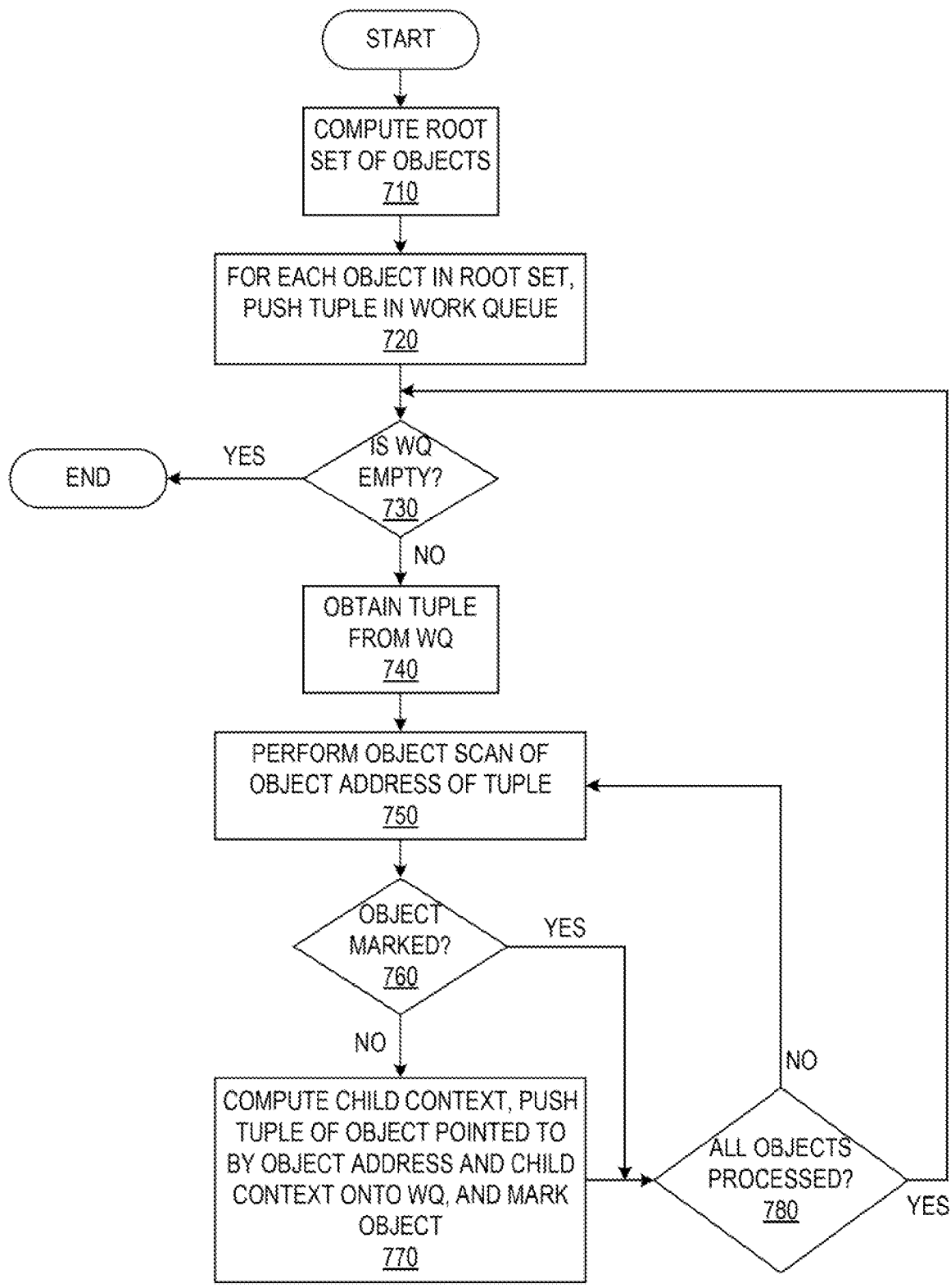
FIG. 7 is a flowchart outlining an example operation for computing a data context using a mark-and-sweep garbage collector in accordance with one illustrative embodiment.
Figure 8:
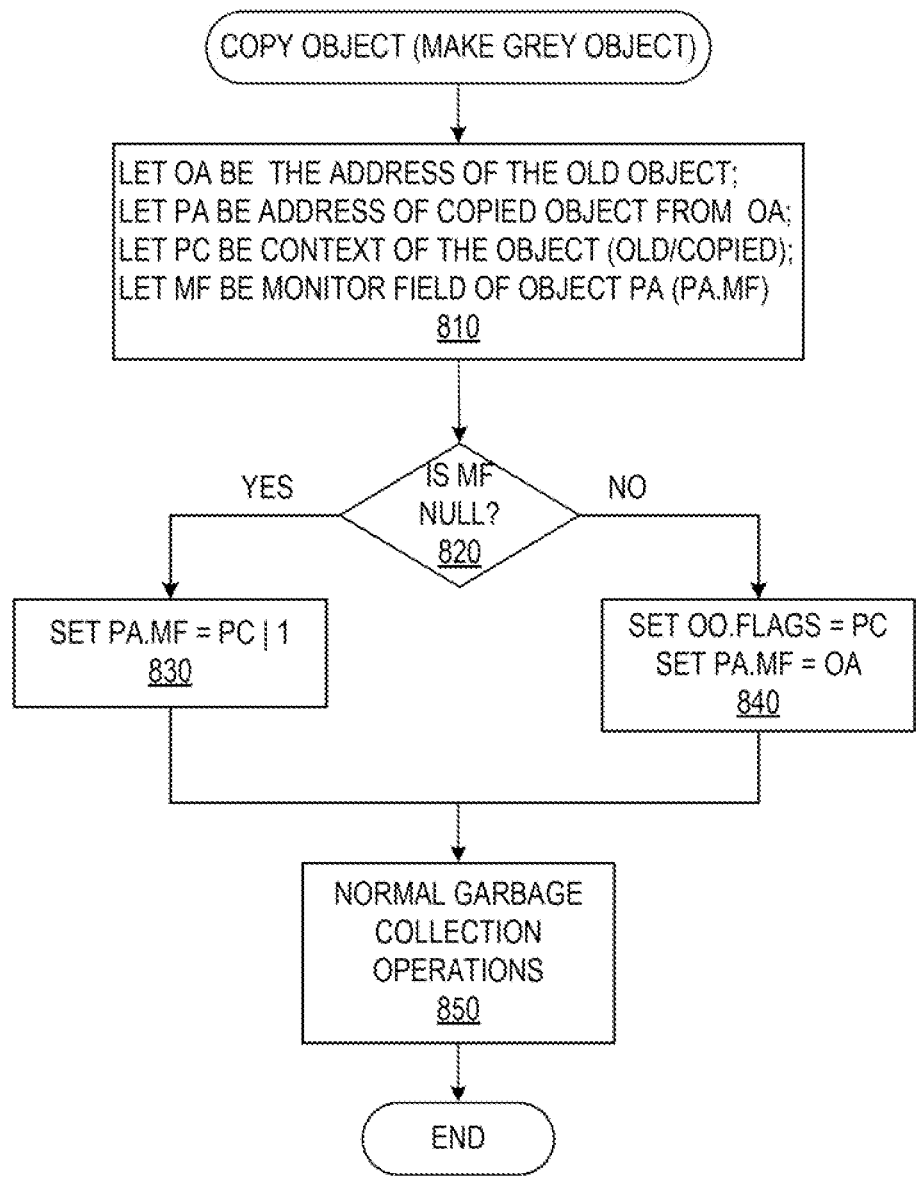
FIG. 8 is a flowchart outlining an example portion of a garbage collection operation illustrating changes to a generational or tracing garbage collector that are made to implement mechanism of one illustrative embodiment when objects are copied and become a grey object.
Figure 9:
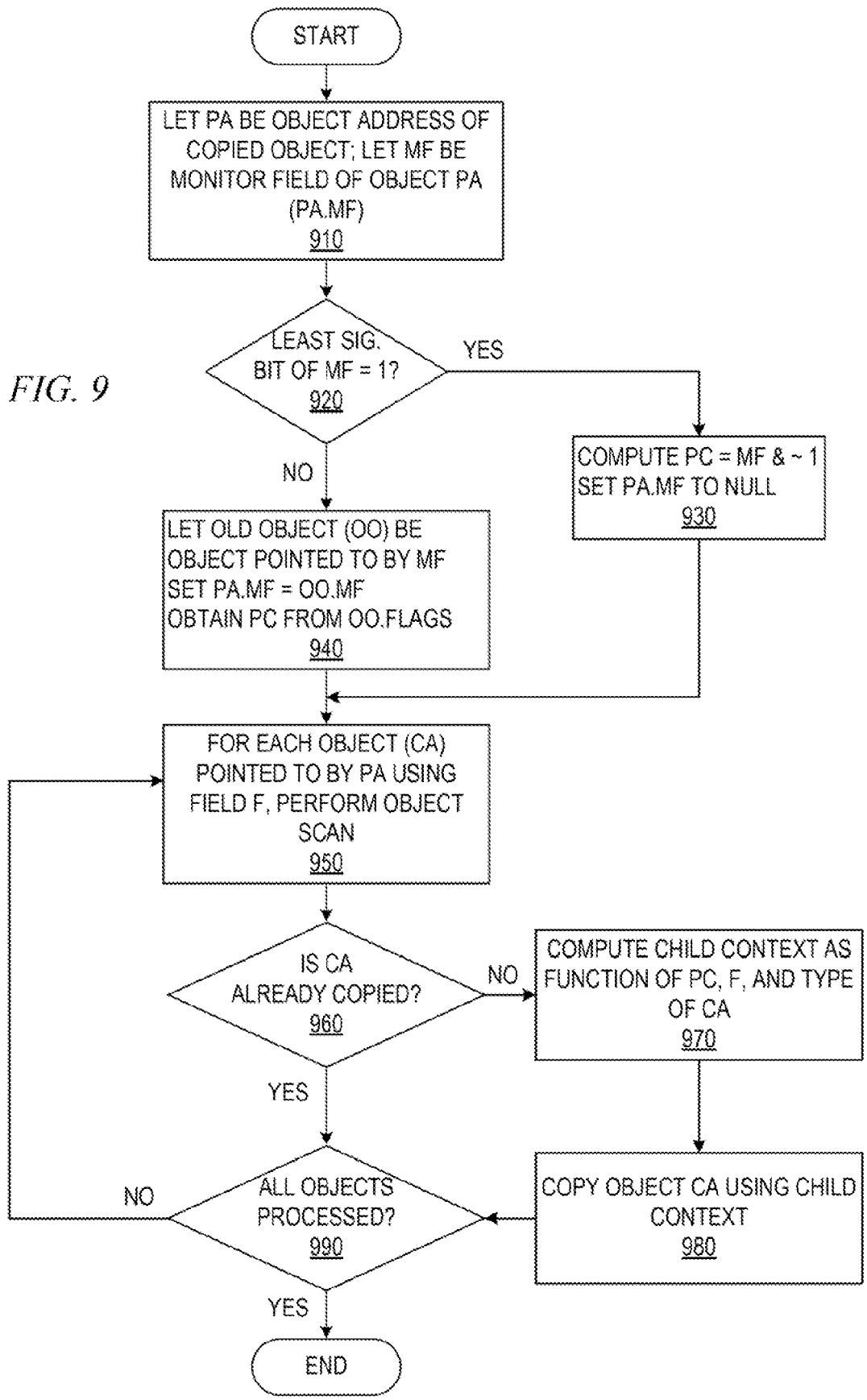
FIG. 9 is a flowchart outlining an example operation of a generational or tracing garbage collector when a copied object is to be scanned, thereby becoming a black object, in accordance with one illustrative embodiment.
Figure 10:
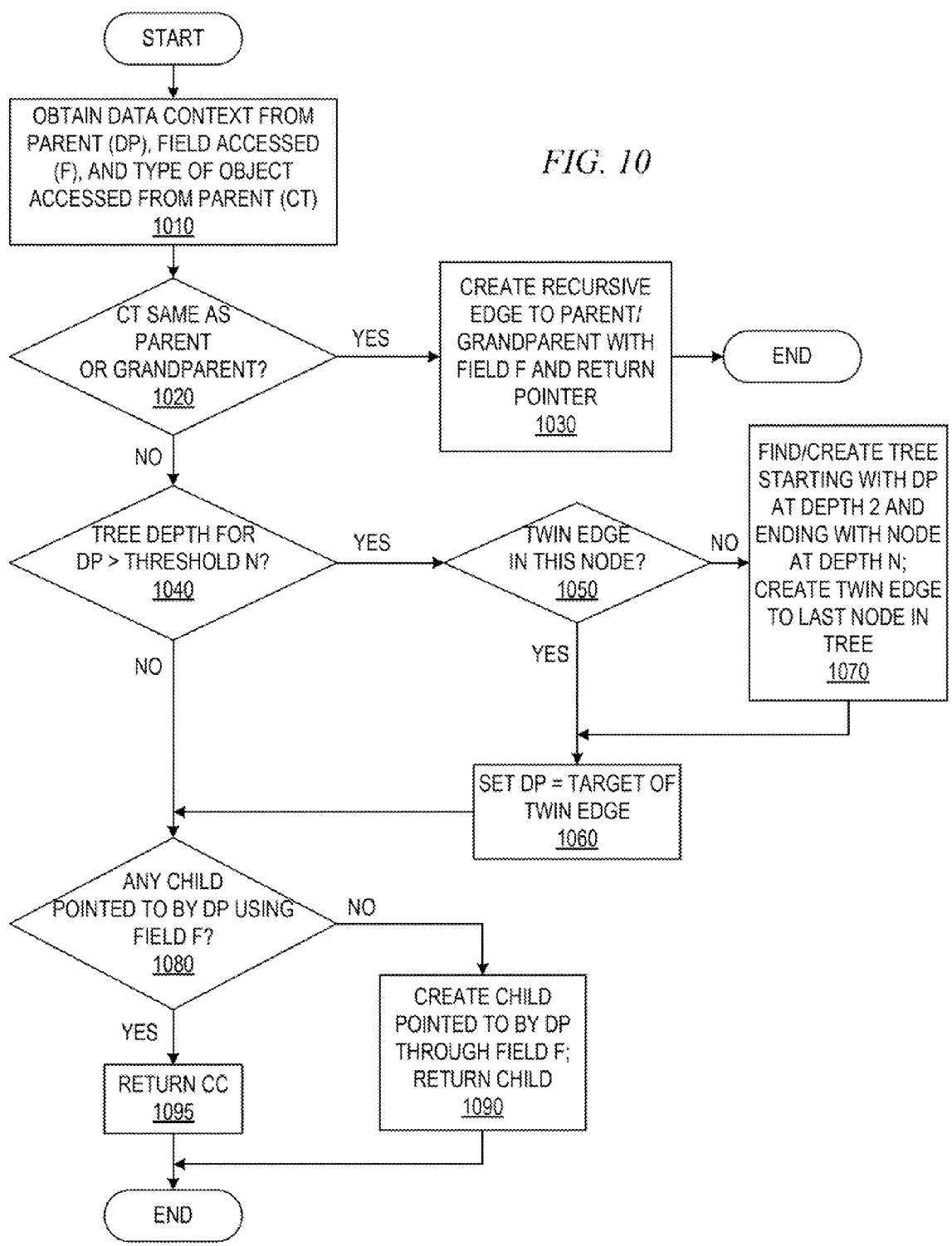
FIG. 10 is a flowchart outlining an example operation for obtaining a child data context for a partial data context tree in accordance with one illustrative embodiment.
Figure 11:
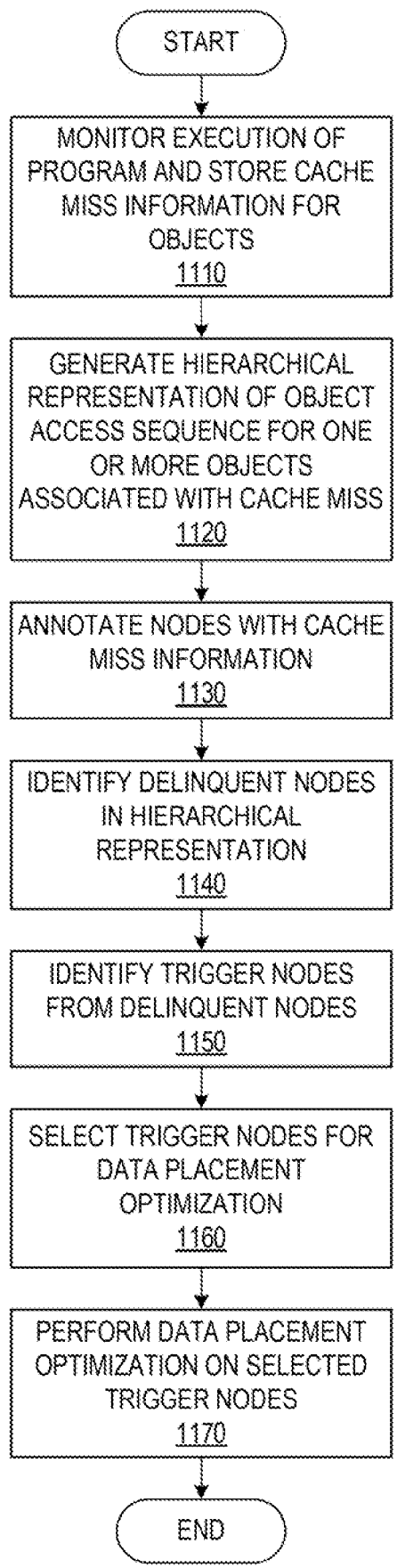
FIG. 11 is a flowchart outlining an example operation for performing a data placement optimization operation in accordance with one illustrative embodiment.

To further define one implementation of the illustrative embodiments, and as a review of the description set forth above, FIGS. 7-11 are provided hereafter as example flowcharts of various operations performed by the primary operational elements shown in FIG. 5. FIG. 7 is a flowchart outlining an example operation for computing a data context using a mark-and-sweep garbage collector in accordance with one illustrative embodiment. FIG. 8 is a flowchart outlining an example portion of a garbage collection operation illustrating changes to a generational or tracing garbage collector that are made to implement mechanism of one illustrative embodiment when objects are copied and become a grey object. FIG. 9 is a flowchart outlining an example operation of a generational or tracing garbage collector when a copied object is to be scanned, thereby becoming a black object, in accordance with one illustrative embodiment. FIG. 10 is a flowchart outlining an example operation for obtaining a child data context for a partial data context tree in accordance with one illustrative embodiment. FIG. 11 is a flowchart outlining an example operation for performing a data placement optimization operation in accordance with one illustrative embodiment.

With reference now to FIG. 7, the operation outlined in FIG. 7 may be performed by the garbage collector, such as garbage collector 530 in FIG. 5, when computing a data context. As shown in FIG. 7, the operation starts with computing the root set of objects by scanning static variables and the thread's registers/stack locations for the program, as is generally known in garbage collection techniques (step 710) For each object in the root set, a tuple is pushed onto a work queue of the garbage collector (step 720). The tuple specifies the object address and an initial data context node obtained from the object type.

A determination is made as to whether the work queue is empty or not (step 730). If the work queue of the garbage collector is empty, the operation terminates. If the work queue is not empty, a tuple is retrieved from the work queue (step 740). An object scan of the object address of the tuple is performed (step 750) to identify each object pointed to by the object address in the tuple using any field F For each object pointed to by the object address of the tuple, a determination is made as to whether the object is marked (step 760). If not, the child data context of the object is computed, a tuple including the object pointed to by the object address and the child data context is pushed into the work queue, and the object is marked (step 770). If the object is already marked, then step 770 is skipped. Thereafter, a determination is made as to whether each object pointed to by the object address of the tuple has been evaluated through steps 750-770 (step 780). If not, the operation returns to step 750 and the operation of steps 750-770 is performed for the next object pointed to by the object address. If each object pointed to by the object pointer has been evaluated through steps 750-770, the operation returns to step 730.

As mentioned above, FIG. 8 is a flowchart outlining an example portion of a garbage collection operation illustrating changes to a generational or tracing garbage collector that are made to implement mechanism of one illustrative embodiment when objects are copied and become a grey object. As shown in FIG. 8, when an object is copied and becomes a grey object in the generational or tracing garbage collector, the mechanisms of the illustrative embodiments determine how to utilize the monitor field and the old objects to store data context information. The operation outlined in FIG. 8 may be implemented within the other typical operations of the garbage collector with regard to copying objects and making objects grey objects.

As shown in FIG. 8, initially the address of the old object is referred to as OA, the address of the copied object from OA is referred to as PA, the data context of the object (old/copied) is referred to as PC, and the monitor field of an object PA is referred to as MF, i.e. PA.MF (step 810). A determination is made as to whether the monitor field (MF) of the object that is being copied is null (step 820). If the monitor field (MF) is not null, then the object's monitor field (PA.MF) is set equal to the data context of the object with the least significant bit being set to "1", i.e. PC|1 (step 830). If the monitor field (MF) of the object is not null, the old object flag bits (OO.FLAGS) is set equal to the data context of the object and the copied object monitor field is set equal to the address of the old object (step 840). The operation then continues on with the normal generational or tracing garbage collector operations with regard to the copied object (step 850) and the operation terminates.

Reference is now made to FIG. 9, which is a flowchart outlining an example operation of a generational or tracing garbage collector when a copied object is to be scanned, thereby becoming a black object, in accordance with one illustrative embodiment. As shown in FIG. 9, again let PA be the object address of the copied object and MF being the monitor field of the object PA (PA.MF) (step 910). A determination is made as to whether the least significant bit of the monitor field is set equal to 1 (step 920). If so, then the context of the object (PC) is equal to the monitor field and the monitor field of the copied object is set to null (the symbols & ~ in FIG. 9 represent a bitwise AND and a bitwise invert operation that eliminates the least significant bit and sets it to 0) (step 930). If the least significant bit is not set to 1, then the old object (OO) is the object pointed to by the monitor field, the monitor field of the copied object (PA.MF) is set equal to the monitor field of the old object, and the data context of the copied object is obtained from the old object flag bits (OO.FLAGS) (step 940).

Thereafter, for each object pointed to by the object address of the copied object using field F (step 950), a determination is made as to whether the object pointed to by the object address of the copied object is already copied (step 960). If not, then the child context is computed as a function of the context of the copied object, the field F, and the type of the object pointed to (step 970). The object pointed to by the object address is then copied (step 980). The operation in step 980 corresponds to the operation outlined in FIG. 8 described above. A determination is made as to whether each object pointed to by the object address has been processed through steps 950-980 (step 990). If not, the operation returns to step 950. Otherwise, the operation terminates.

As mentioned above, FIG. 10 is a flowchart outlining an example operation for obtaining a child data context for a partial data context tree in accordance with one illustrative embodiment. As shown in FIG. 10, the operation starts by obtaining data context for the child object from a parent object (DP) including the field accessed (F) and type of object accessed from the parent through field F (CT) (step 1010). A determination is made as to whether the type CT for the child object is the same as the parent or grandparent object (step 1020). If so, then a recursive edge to the parent or grandparent object with field F is created and a pointer is returned to the parent or grandparent object (step 1030). If the type CT is not the same as the parent or grandparent object, then a determination is made as to whether the tree depth for the child object's node in the tree is greater than a predetermined depth threshold N (step 1040).

If the depth is greater than the depth threshold N, then a determination is made as to whether there is a twin edge in the node (step 1050), such as the twin edge mentioned above with regard to the example PDCTs in FIG. 4. If the node has a twin edge, then the data context from the parent is set equal to the target of the twin edge (step 1060). If the node does not have a twin edge, then a tree is found or created (if it does not exist) starting with the parent node at depth 2 and ending with node at depth N and a twin edge is created to the last node in the tree (step 1070). Thereafter, the operation continues to step 1060.

Thereafter, or if the tree depth for the child object's node is not greater than the depth threshold (step 1040), then a determination is made as to whether there are any child objects pointed to by the current child object using field F (step 1080). If not, then a child object is created that is pointed to by the data context of the parent object through field F and the child object is returned (step 1090). If there is a child object pointed to by the data context of the parent object, then the pointer to the child object in the PDCT is returned to the logic calculating the child context (step 1095). In other words, if the child object already exists, then the pointer to the child object in the PDCT is returned, otherwise the child object is created and the child object is returned.

Having generated the data context information, the monitor fields of the objects being set, and child data contexts being computed, the generated data context information may be used with performance counter information for cache misses to perform data placement operations. FIG. 11 is a flowchart outlining an example operation for performing a data placement optimization operation in accordance with one illustrative embodiment.

As shown in FIG. 11, the operation starts by monitoring the execution of a program and storing cache miss information for individual objects and for the execution as a whole in performance counters (step 1110). A hierarchical representation of an object access sequence is generated for one or more objects for which a cache miss is identified (step 1120). As mentioned above, this hierarchical representation may be a data context graph, data context tree, partial data context tree, or the like. Nodes in the hierarchical representation are annotated with cache miss information (step 1130). Based on the cache miss information for nodes in the hierarchical representation and a delinquency threshold value, delinquent nodes in the hierarchical representation are identified (step 1140). Of the delinquent nodes, trigger nodes in the hierarchical representation are identified (step 1150).

A trigger node threshold is applied to select which trigger nodes are to be the basis for data placement optimization (step 1160). The selected trigger nodes and their sub-trees are then subjected to data placement optimization (step 1170). As noted above, this may involve a tree-based data placement optimization or a histogram-based data placement optimization based on whether the trigger object, and its related objects in its sub-tree, are scalar objects or array objects. It should be noted that this data placement essentially places connected objects close to one another, such as in adjacent address ranges or memory regions, of a memory heap, the data cache, or the like. Once the data placement optimization is performed, the operation then terminates. While FIG. 11 shows a termination of the operation, it should be appreciated that this operation may be repeated periodically, such as part of a garbage collection operation, or may be continuously performed as part of the execution of the program.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for data placement optimization during runtime of a computer program, comprising:
   detecting, by a processor of the data processing system, cache misses in a cache of the data processing system;
   collecting, by the processor, cache miss information for objects of the computer program;
   generating, by the processor, data context information for an object in an object access sequence of the computer program, wherein the data context information identifies one or more additional objects accessed as part of the object access sequence in association with the object, and wherein the generation of the data context information is performed during a garbage collection operation of the data processing system;
   correlating, by the processor, the cache miss information with the data context information of the object; and
   performing, by the processor, data placement optimization on the object, in the object access sequence, with which the cache miss information is associated, based on the correlation of the cache miss information with the data context information of the object, wherein the data placement optimization places connected objects in the object access sequence in close proximity to each other in a memory structure of the data processing system,
   wherein the data context information for the object is stored in one of an old object in a from-space of the garbage collection operation that corresponds to the object, or a new object in a to-space of the garbage collection operation that corresponds to the object, wherein the data context information is stored in an object monitor field of the new object in response to the monitor field of the new object not indicating a lock of the new object, and wherein a least significant bit of the object monitor field is set to indicate that the data context information is stored in the object monitor field, and wherein the data context information is stored in a field of the old object in response to the monitor field of the new object indicating a lock of the new object.

2. The method of claim 1, wherein the garbage collection operation is one of a mark-and-sweep garbage collection operation or a generational garbage collection operation.

3. The method of claim 1, wherein, in response to the monitor field of the new object indicating a lock of the new object, a pointer to the old object is stored in an object monitor field of the new object, and a least significant bit of the object monitor field of the new object is set to indicate that the data context information is stored in the old object pointed to by the pointer in the object monitor field.

4. The method of claim 1, wherein correlating the cache miss information with the data context information of the object comprises:
   generating a hierarchical representation of the data context information; and
   annotating one or more nodes of the hierarchical representation with cache miss information corresponding to the one or more nodes.

5. The method of claim 4, wherein annotating the one or more nodes of the hierarchical representation comprises storing a cache miss count indicating a number of cache misses occurring in an object corresponding to the node.

6. The method of claim 4, wherein the hierarchical representation is one of a data context graph, a data context tree, or a partial data context tree.

7. A method, in a data processing system, for data placement optimization during runtime of a computer program, comprising:
   detecting, by a processor of the data processing system, cache misses in a cache of the data processing system;
   collecting, by the processor, cache miss information for objects of the computer program;
   generating, by the processor data context information for an object in an object access sequence of the computer program, wherein the data context information identifies one or more additional objects accessed as part of the object access sequence in association with the object, and wherein the generation of the data context information is performed during a garbage collection operation of the data processing system;
   correlating, by the processor, the cache miss information with the data context information of the object; and
   performing, by the processor, data placement optimization on the object, in the object access sequence, with which the cache miss information is associated, based on the correlation of the cache miss information with the data context information of the object, wherein the data placement optimization places connected objects in the object access sequence in close proximity to each other in a memory structure of the data processing system wherein correlating the cache miss information with the data context information of the object comprises:
   generating a hierarchical representation of the data context information; and
   annotating one or more nodes of the hierarchical representation with cache miss information corresponding to the one or more nodes, and wherein performing data placement optimization comprises:
   identifying a trigger node in the hierarchical representation; and
   storing objects in a sub-portion of the hierarchical representation, corresponding to the trigger node, in close proximity to each other in the memory structure, wherein a trigger node is a node of the hierarchical representation having a node miss rate that meets a predetermined criteria, and wherein the node miss rate is a ratio of a number of cache misses caused by an object corresponding to a total number of cache misses.

8. The method of claim 7, wherein if the trigger node corresponds to an array object, storing objects in a sub-portion of the hierarchical representation further comprises:

generating a histogram of cache miss information for elements of the array object; and performing the storing of objects in the sub-portion of the hierarchical representation in close proximity to each other for objects corresponding to elements of the array object that meet a predetermined criteria, based on the histogram.

9. A computer program product comprising a computer readable storage medium having a computer readable program stored therein, wherein the computer readable program, when executed on a computing device, causes the computing device to:

detect cache misses in a cache of the computing device;

collect cache miss information for objects of the computer program;

generate data context information for an object in an object access sequence of the computer program, wherein the data context information identifies one or more additional objects accessed as part of the object access sequence in association with the object, and wherein the generation of the data context information is performed during a garbage collection operation of the computing device;

correlate the cache miss information with the data context information of the object; and perform data placement optimization on the object, in the object access sequence, with which the cache miss information is associated, based on the correlation of the cache miss information with the data context information of the object, wherein the data placement optimization places connected objects in the object access sequence in close proximity to each other in a memory structure of the computing device, wherein the data context information for the object is stored in one of an old object in a from-space of the garbage, collection operation that corresponds to the object, or a new object in a to-space of the garbage collection operation that corresponds to the object, wherein the data context information is stored in an object monitor field of the new object in response to the monitor field of the new object not indicating a lock of the new object, and wherein a least significant bit of the object monitor field is set to indicate that the data context information is stored it the object monitor field, and wherein the data context information is stored in a field of the old object in response to the monitor field of the new object indicating a lock of the new object.

10. The computer program product of claim 9, wherein the garbage collection operation is one of a mark-and-sweep garbage collection operation or a generational garbage collection operation.

11. The computer program product of claim 9, wherein, in response to the monitor field of the new object indicating a lock of the new object, a pointer to the old object is stored in an object monitor field of the new object, and a least significant bit of the object monitor field of the new object is set to indicate that the data context information is stored in the old object pointed to by the pointer in the object monitor field.

12. The computer program product of claim 9, wherein the computer readable program causes the computing device to correlate the cache miss information with the data context information of the object by:

generating a hierarchical representation of the data context information; and annotating one or more nodes of the hierarchical representation with cache miss information corresponding to the one or more nodes.

13. The computer program product of claim 12, wherein the hierarchical representation is one of a data context graph, a data context tree, or a partial data context tree.

14. A computer program product comprising a computer readable storage medium having a computer readable program stored therein, wherein the computer readable program, when executed on a computing device, causes the computing device to:

detect cache misses in a cache of the computing device;

collect cache miss information for objects of the computer program;

generate data context information for an abject in an object access sequence of the computer program, wherein the data context information identifies one or more additional objects accessed as part of the object access sequence in association with the object, and wherein the generation of the data context information is performed during a garbage collection operation of the computing device;

correlate the cache miss information with the data context information of the object; and perform data placement optimization on the object, in the object access sequence, with which the cache miss information is associated, based on the correlation of the cache miss information with the data context information of the object, wherein the data placement optimization places connected objects in the object access sequence in close proximity to each other in a memory structure of the computing device, wherein the computer readable program causes the computing device to correlate the cache miss information with the data context information of the object by:

generating a hierarchical representation of the data context information; and annotating one or more nodes of the hierarchical representation with cache miss information corresponding, to the one or more nodes, and wherein the computer readable program causes the computing device to perform data placement optimization by:

identifying a trigger node in the hierarchical representation; and storing objects in a sub-portion of the hierarchical representation, corresponding to the trigger node, in close proximity to each other in the memory structure, wherein a trigger node is a node of the hierarchical representation having a node miss rate that meets a predetermined criteria, and wherein the node miss rate is a ratio of a number of cache misses caused by an object corresponding to a total number of cache misses.

15. The computer program product of claim 14, wherein if the trigger node corresponds to an array object, storing objects in a sub-portion of the hierarchical representation further comprises:

generating a histogram of cache miss information for elements of the array object; and performing the storing of objects in the sub-portion of the hierarchical representation in close proximity to each other for objects corresponding to elements of the array object that meet a predetermined criteria, based on the histogram.

16. An apparatus, comprising:

a processor; and a memory coupled to the processor, wherein the memory comprises instructions which, when executed by the processor, cause the processor to:

detect cache misses in a cache of the computing device;

collect cache miss information for objects of the computer program;

generate data context information for an object in an object access sequence of the computer program, wherein the data context information identifies one or more additional objects accessed as part of the object access sequence in association with the object, and wherein the generation of the data context information is performed during a garbage collection operation of the computing device;

correlate the cache miss information with the data context information of the object; and perform data placement optimization on the object, in the object access sequence, with which the cache miss information is associated, based on the correlation of the cache miss information with the data context information of the object, wherein the data placement optimization places connected objects in the object access sequence in close proximity to each other in a memory structure of the computing device, wherein the data context information for the object is stored in one of an old object in a from-space of the garbage collection operation that corresponds to the object, or a new object in a to-space of the garbage collection operation that corresponds to the object, wherein the data context information is stored in an object monitor field of the new object in response to the monitor field of the new object not indicating a lock of the new object, and wherein a least significant bit of the object monitor field is set to indicate that the data context information is stored in the object monitor field, and wherein the data context information is stored in a field of the old object in response to the monitor field of the new object indicating a lock of the new object.

17. The computer program product of claim 12, wherein the computer readable program causes the computing device to annotate the one or more nodes of the hierarchical representation by storing a cache miss count indicating a number of cache misses occurring in an object corresponding to the node.

* * * * *